July 5, 1966 J. F. TAPLIN 3,259,144
PRESSURE REGULATOR WITH INTEGRAL GAGE
Filed June 1, 1964
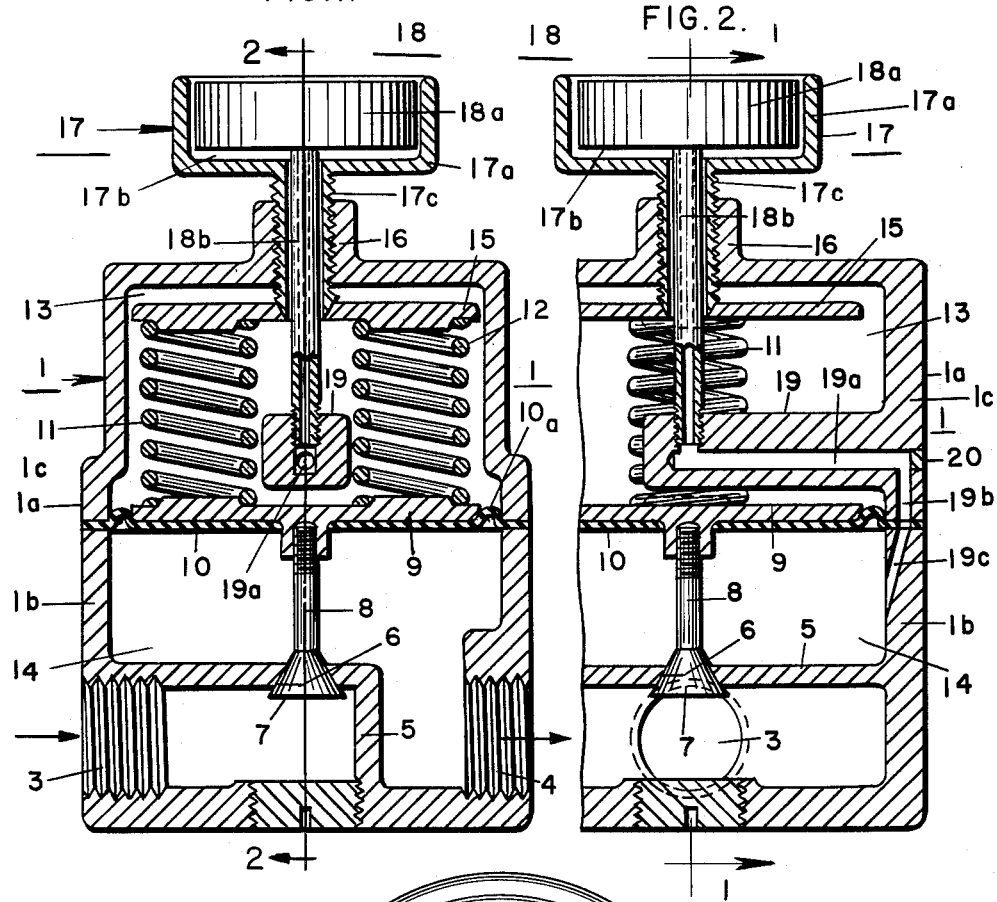
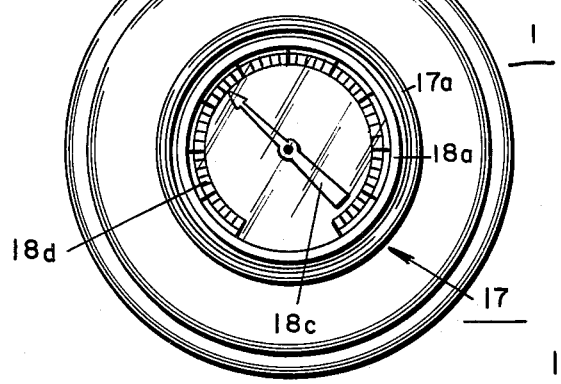
INVENTOR:
JOHN F. TAPLIN,
BY [signature] ATTORNEY

United States Patent Office 3,259,144
Patented July 5, 1966

3,259,144
PRESSURE REGULATOR WITH INTEGRAL GAGE
John F. Taplin, 15 Sewall St., West Newton, Mass.
Filed June 1, 1964, Ser. No. 371,411
7 Claims. (Cl. 137—505.41)

This invention refers to pressure regulators for gaseous media.

It is a general object of this invention to provide improved compact combinations of pressure regulators for gaseous media and of pressure gages.

As a general rule each pressure regulator for gaseous media is associated with a pressure gage indicating the presure level at the outlet duct of the pressure regulator. The gage is generally arranged at a point more or less remote from the housing of the pressure regulator, and connected with the latter by an external duct. Such arrangements are too bulky in any instance where space is at a premium.

It is, therefore, another object of this invention to provide integral combinations of pressure regulators and pressure gages dispensing with external ducts connecting the housing of the pressure regulator with the pressure gage.

A further object of this invention is to provide integral combinations of pressure regulators and of pressure gages wherein the manual adjusting means for the pressure regulator and the pressure gage are arranged in the same line of sight.

Still another object of the invention is to provide integral combinations of pressure regulators and of pressure gages wherein the adjusting screw for the pressure regulator and the pressure gage form an integral structural unit.

The invention both as to its structure and method of operation together with further objects and advantages will be described below in greater detail in connection with the accompanying drawings wherein FIG. 1 is a vertical section across a combined pressure regulator and pressure gage embodying this invention taken along 1—1 of FIG. 2;

FIG. 2 is a vertical section across the structure of FIG. 1 taken along 2—2 of FIG. 1; and FIG. 3 is a top plan view of the structure of FIGS. 1 and 2.

Referring now to the drawings numeral 1 has been applied to generally indicate a substantially cylindrical pressure regulator or valve housing comprising an upper housing portion 1a and a lower housing portion 1b. Both housing portions 1a, 1b may be integrated by suitable means (not shown), e.g. by flanges and screws, into a structural unit. The lower portion 1b of the housing 1 defines an inlet duct 3 and an outlet duct 4. Partition 5 separates inlet duct 3 from outlet duct 4 arranged coaxially to inlet duct 3. Partition 5 defines a valve opening 6 forming a valve seat. Valve element 7 is movable within valve opening 6. Lowering of valve element 7 results in opening of the valve opening and in progressive increase of the effective cross-sectional area of valve opening 6, i.e. of the area of the gap formed between valve element 7 and its seat. Valve element 7 is arranged along the longitudinal axis of the valve housing 1 and supported by valve stem 8 projecting downwardly from a plate 9. Plate 9 is integral with the radially inner area of a diaphragm 10 whose radially outer area is clamped between portions 1a and 1b of housing 1. Diaphragm 10 forms a convolution 10a between its radially inner area and its radially outer area. Diaphragm 10 subdivides housing 1 in an upper chamber 13 and a lower chamber 14, which lower chamber communicates with outlet port 4. Helical compression springs 11 and 12 rest upon the upper surface of plate 9. These two springs are arranged in upper chamber 13. The axes of springs 11 and 12 are parallel to but spaced from the common axis of housing 1 and valve element 7. Springs 11, 12 form a symmetrical pattern relative to a vertical plane including the vertical axis of housing 1. This vertical plane is the plane along which section 2—2 has been taken. The ends of compression springs 11, 12 remote from plate 9 and diaphragm 10 rest against an abutment plate 15 parallel to lower plate 9. The upper portion 1a of housing 1 is provided with a coaxial internally screw-threaded collar 16. Abutment plate 15 is adjustable by means of an adjustment screw generally indicated by reference numeral 17. Adjustment screw 17 includes a substantially knob-shaped screw head 17a defining a cylindrical cavity 17b and a hollow externally screw threaded shaft 17c. The external screw threads on shaft 17c engage the internal screw threads in collar 16 and the lower end of shaft 17 abuts against abutment plate 15. To be more specific, the lower end of shaft 17 is in the shape of a frustrated cone engaging a central recess in abutment plate 15 which is equally cone shaped. Thus shaft 17b and abutment plate 15 form a slip joint. Numeral 18 has been applied to generally indicate a pressure gage. Pressure gage 18 includes a substantially cylindrical gage housing 18a recessed in the cylindrical cavity 17b of knob-shaped screw head 17a. Pressure gage 18 further includes a hollow stem 18b projecting from gage housing 18a along the common axis of housing 1 and valve element 7 through hollow shaft 17c on knob-shaped screw head 17a. Stem 18b projects through an opening in plate 15 beyond the lower end of shaft 17c and is externally screw-threaded at the lower end thereof. The lower screw-threaded end of hollow stem 18b is screwed into a boss 19 and thus connected by duct means with the lower chamber 14 in housing 1. These duct means are, in part, formed by boss 19 projecting radially inwardly from the lateral wall 1c of the upper portion 1a of housing 1 and having a radial bore 19a. As clearly shown in FIG. 1 springs 11 and 12 are arranged to different sides of boss 19. The radially outer end of radial bore 19a is closed by a plug 20. This end of bore 19a is continued by an axially extending bore 19b in lateral wall 1c of upper housing portion 1a and by a radially outward slanting bore 19c in lower housing portion 1b. Bore 19c has an inlet situated in chamber 14. The lower end of hollow stem 18b which is externally screw threaded engages an internally screw-threaded axial bore or orifice in boss 19 situated close to the radially inner end thereof. Thus fluid in chamber 14 is allowed to flow through bores 19c, 19b, 19a and the hollow stem 18b into a pressure sensing element (not shown) such as, for instance, a Bourdon tube, arranged inside of gage housing 18a. This pressure sensing element operates a hand 18c moving over a circular pressure-indicating scale 18d.

The desired pressure to be maintained in chamber 14 and outlet duct 4 can be regulated by turning the knot-shaped screw head 17a selectively in clockwise or counterclockwise direction. This changes the pressure of springs 11 and 12 tending to lower plate 9 and diaphragm 10 and to lower valve element 7. This pressure is counteracted by the pressure of a gaseous medium inside chamber 14. The pressure prevailing in chamber 14 can conveniently instantly be ready on the scale 18d of the pressure gage which is within the hand of the operator operating the adjustment screw 18.

It will be understood that while but one embodiment of this invention has been shown and described in detail, the invention is not limited thereto and that the illustrated embodiment may be modified or other embodiments made without departing from the spirit and scope of the invention as set forth in the accompanying claims.

It is claimed:

1. A pressure regulator for gaseous media comprising in combination:
   (a) a valve housing defining an inlet duct and an outlet duct and having a partition separating said inlet duct from said outlet duct and defining a valve opening, said valve housing further including a lateral wall having an internal projection defining a passageway having an inlet adjacent said lateral wall communicating with said outlet duct of said valve housing and an outlet remote from said lateral wall;
   (b) a diaphragm separating said housing into a first chamber including said inlet of said passageway and a second chamber accommodating said projection;
   (c) a valve element supported by said diaphragm movable inside said valve opening;
   (d) spring means in said second chamber biasing said diaphragm to move said valve element relative to said valve opening;
   (e) an abutment for the end of said spring means remote from said diaphragm;
   (f) an adjustment screw for said abutment, said adjustment screw including a screw head defining a cavity and a hollow externally screw-threaded shaft having an end remote from said screw head bearing against said abutment and forming a slip joint with said abutment; and
   (g) a pressure gage including a gage housing arranged inside said cavity of said screw head of said adjusting screw, said pressure gage further including a hollow stem projecting from said gage housing through said hollow shaft of said adjusting screw and having an end remote from said gage housing communicating with said passageway defined by said internal projection of said lateral wall of said valve housing.

2. A pressure regulator for gaseous media comprising in combination:
   (a) a substantially cylindrical valve housing including a lower housing portion and an upper housing portion, said lower housing portion defining an inlet duct and an outlet duct and having a portion separating said inlet duct from said outlet duct and defining a valve opening, said valve housing further including a lateral wall having a duct-forming boss extending radially inward from said lateral wall and having an inlet situated at a relatively low level immediately adjacent said lateral wall and an outlet situated at a relatively high level substantially at the point of intersection of the axis of said valve housing with said boss;
   (b) a diaphragm separating said valve housing into a lower chamber including said inlet of said passageway and an upper chamber accommodating said boss;
   (c) a valve element supported by said diaphragm and movable inside said valve opening;
   (d) a plurality of helical compression springs inside said upper chamber having axes parallel to and spaced from said axis of said valve housing and forming a symmetrical pattern relative to a plane including said axis of said valve housing, said plurality of springs biasing said diaphragm to move said valve element relative to said valve opening;
   (e) a common abutment plate for the ends of said plurality of springs remote from said diaphragm;
   (f) an adjusting screw for said abutment plate, said adjusting screw including a substantially knob-shaped screw head defining a substantially cylindrical cavity and a hollow externally screw-threaded shaft engaging a corresponding screw thread integral with said valve housing and having an end remote from said screw-head engaging said common abutment plate and forming a slip joint with said abutment plate; and
   (g) a pressure gage including a substantially cylindrical gage housing arranged inside said cavity of said screw head of said adjusting screw, said pressure gage further including a hollow stem projecting from the base surface of said gage housing through said hollow shaft of said adjusting screw and having an end remote from said gage housing connected to said outlet of said passageway defined by said projection of said lateral wall of said valve housing.

3. A pressure regulator for gaseous media comprising in combination:
   (a) a substantially cylindrical valve housing defining an inlet duct and an outlet duct and having a partition separating said inlet duct from said outlet duct and defining a valve opening;
   (b) a diaphragm separating said valve housing into a first chamber adjacent said partition communicating with said outlet duct and a second chamber remote from said partition;
   (c) a valve element supported by said diaphragm movable inside said valve opening to vary the effective cross-sectional area thereof;
   (d) compression spring means inside said second chamber biasing said diaphragm to move said valve element to increase the effective cross-sectional area of said valve opening;
   (e) an abutment for the end of said spring means remote from said diaphragm;
   (f) an adjusting screw for said abutment, said adjusting screw including a substantially knob-shaped screw head defining a cavity and a hollow externally screw-threaded shaft having one end remote from said screw head bearing against said abutment and forming a slip joint with said abutment;
   (g) a pressure gage including a gage housing recessed inside said cavity of said screw head of said adjusting screw, said pressure gage further including a hollow stem projecting from said gage housing through and beyond said hollow shaft of said adjusting screw; and
   (h) duct means connecting said first chamber of said valve housing with the portion of said hollow stem of said pressure gage projecting beyond said hollow shaft of said adjusting screw.

4. A pressure regulator as specified in claim 3 wherein said duct means are integral with said valve housing.

5. A pressure regulator for gaseous media comprising in combination:
   (a) a valve including a valve housing and a valve element inside said valve housing movable relative to said valve housing to regulate the flow of gas through said valve;
   (b) spring means balanced by pressure prevailing inside said valve housing controlling the position of said valve element relative to said valve housing;
   (c) an adjusting screw for said spring means, said adjusting screw including a substantially knob-shaped screw head defining a substantially cylindrical cavity having an inner diameter but slightly less than the outer diameter of said screw head, said adjusting screw further including a hollow shaft arranged in coaxial relation to said valve element and having an end remote from said screw head acting upon said spring means to vary the degree of compression thereof;
   (d) a pressure gage including a substantially cylindrical gage housing having an outer diameter but slightly less than said inner diameter of said cavity in said screw head recessed in said cavity in said screw head, said pressure gage further including a hollow stem projecting from the base surface of said gage housing through said hollow shaft of said adjusting screw to a point beyond said end of said hollow shaft of said adjusting screw; and (e) duct means connecting a point inside of said valve housing with the portion of said hollow stem projecting beyond said hollow shaft, said duct means being at least in part defined by said valve housing.

6. A pressure regulator for gaseous media comprising in combination:
 (a) a valve including a valve housing and a valve element inside said valve housing movable relative to said valve housing to regulate the flow of gas through said valve, said valve housing further including an internally screw-threaded collar arranged in coaxial relation to said valve element on the top surface of said valve housing;
 (b) a plurality of helical springs balanced by pressure prevailing inside said valve housing and acting upon said valve element to control the position of said valve element relative to said valve housing, each of said plurality of helical springs having an axis parallel to and spaced from said axis of said valve element;
 (c) an adjusting screw for said spring means, said adjusting screw including a substantially cylindrical knob-shaped screw head defining a cavity therein, said adjusting screw further including an externally screw threaded hollow shaft screwed into said collar on said valve housing and having an end remote from said screw-head acting jointly upon said plurality of helical springs to vary the degree of compression thereof;
 (d) a pressure gage including a gage housing recessed in said cavity of said adjusting screw, said pressure gage further including a hollow stem projecting from the base surface of said gage housing through and beyond said hollow shaft of said adjusting screw; and
 (e) duct means connecting a point inside said valve housing with a point of said hollow stem projecting beyond said hollow shaft, said duct means being at least in part defined by said valve housing.

7. A pressure regulator for gaseous media comprising in combination:
 (a) a valve including a valve housing and a valve element inside said valve housing movable relative to said valve housing to regulate the flow of gas through said valve, said valve housing including a lateral wall having an internal projection defining a passageway extending from said lateral wall inwardly to the inner end of said projection, said inner end of said projection defining an internally screw-threaded orifice;
 (b) compression spring means balanced by pressure prevailing inside said valve housing controlling the position of said valve element relative to said valve housing;
 (c) an adjusting screw for said spring means including a substantially knob-shaped screw head defining a substantially cylindrical cavity therein, said adjusting screw further including an externally screw-threaded hollow shaft having an end remote from said screw head acting upon said spring means to vary the degree of compression thereof;
 (d) a pressure gage including a gage housing recessed in said cavity of said screw head of said adjusting screw, said pressure gage further including a hollow stem projecting from the base surface of said gage housing through and beyond said hollow shaft of said adjusting screw, and said hollow stem having an externally screw-threaded end cooperatively engaging said internally screw-threaded orifice at said inner end of internal projection of said valve housing; and
 (e) duct means connecting a point inside valve housing with said internally screw threaded orifice at said inner end of said internal projection of said lateral wall of said valve housing.

References Cited by the Examiner
UNITED STATES PATENTS
3,134,400   5/1964   Schfter _____ 137—505.39 X WILLIAM F. O'DEA, *Primary Examiner.*
H. WEAKLEY, *Assistant Examiner.*